United States Patent [19]

Chen et al.

[11] Patent Number: 5,706,508

[45] Date of Patent: Jan. 6, 1998

[54] SYSTEM AND METHOD FOR MONITORING SNMP TABLES

[75] Inventors: David De-Hui Chen, Cary; William Frank McKenzie, Jr., Raleigh; Zvonimir Ordanic, Raleigh; Leo Temoshenko, Raleigh, all of N.C.

[73] Assignee: International Business Machines Corporation, Armonk, N.Y.

[21] Appl. No.: 42,952

[22] Filed: Apr. 5, 1993

[51] Int. Cl.$^6$ .................................................. G06F 15/40
[52] U.S. Cl. .................. 395/616; 395/601; 395/614; 395/619
[58] Field of Search ................. 395/800, 200, 395/500, 700, 650, 601, 614, 619; 364/DIG. 1; 370/85.6

[56] References Cited

U.S. PATENT DOCUMENTS

| | | | |
|---|---|---|---|
| 4,646,229 | 2/1987 | Boyle | 364/DIG. 1 |
| 5,101,348 | 3/1992 | Arrowood et al. | 395/200 |
| 5,185,860 | 2/1993 | Wu | 395/200 |
| 5,280,612 | 1/1994 | Lorie et al. | 395/600 |
| 5,291,583 | 3/1994 | Bapat | 395/500 |
| 5,317,568 | 5/1994 | Bixby et al. | 370/85.6 |
| 5,317,742 | 5/1994 | Bapat | 395/700 |
| 5,345,587 | 9/1994 | Fehskens et al. | 395/650 |
| 5,347,653 | 9/1994 | Flynn et al. | 395/600 |
| 5,367,635 | 11/1994 | Bauer et al. | 395/200 |
| 5,410,695 | 4/1995 | Frey et al. | 395/650 |
| 5,436,909 | 7/1995 | Dev et al. | 371/20.1 |
| 5,471,617 | 11/1995 | Farrand et al. | 395/700 |
| 5,574,897 | 11/1996 | Hersmeier et al. | 395/600 |

FOREIGN PATENT DOCUMENTS 0224681  7/1986  European Pat. Off. .

OTHER PUBLICATIONS

Mansfield et al., "An SNMP-Based Expert Network Management System for a Large-Scale OSI-Based Campus Network", IEEE, Apr. 1-3, 1992, pp. 695-700.

The Simple Book An Introduction to Management of TCP/IP-Based Internets, pp. 131-158, M. T. Rose "Mechanism: SNMP", p. 140, 1st para.

Conf-NOMS '92 Networks Without Bounds, IEEE 1992 Network Operations & Mgt. Symposium, vol. 2, 1992, pp. 254-265.

IEEE Global Telecommunicaitons Conf., vol. 2.

*Primary Examiner*—Alyssa H. Bowler
*Assistant Examiner*—Walter D. Davis
*Attorney, Agent, or Firm*—Stephen T. Keohane; John J. Timar

[57] ABSTRACT

A new system and method allows a Manager in a Simple Network Management Protocol (SNMP) environment to gather updates from its Agents. The system and method comprise the unique provision of an index which is used in each of the Agent's tables for indicating the various revisions thereof. The index lexicographically increases with each revision to the table. The Manager maintains a record of the index of the data which it has received from its Agents, requesting only that data having a lexicographically larger indexing. Further, the index is used in related tables so that the tables will be kept in "sync" in that the Manager will know whether it has the latest updates so that an accurate picture may be portrayed.

5 Claims, 6 Drawing Sheets

SYSTEM AND METHOD FOR MONITORING SNMP TABLES

BACKGROUND OF THE INVENTION

I. Field of the Invention

The present invention relates to network management using the Simple Network Management Protocol (SNMP) and, more particularly, to a system and method for monitoring SNMP tables.

II. Background and Prior Art

Data communication has become a fundamental part of computing. World-wide networks gather data about such diverse subjects as atmospheric conditions, crop production, and airline traffic. These networks evolved as independent entities without the ability, or, until recently, the need, to interconnect with one another. New technologies, generically named "internetworking", have emerged making it possible to interconnect many disparate physical networks and make them function as a coordinated unit. Using internetworking technologies, a host, for example, on one network, may traverse multiple networks and communicate with another host on a different network.

The size of an "internet", or group of interconnected networks, can vary quite significantly. For instance, the resulting network may be enormously large, such as the nation-wide DARPA (Defense Advanced Research Projects Agency)/NSF (National Science Foundation) Internet which connects most major research institutions, including universities, corporate and government labs. Conversely, the network may be relatively small, comprising only a single corporation's individual local area networks (LANs).

No matter the size of the network, it is clear that the task of effectively managing the resulting interconnected network is quite important and has been given a great deal of attention in the networking community. In managing a network, a network manager must keep track of the devices on the networks, monitor the network's performance and load, and diagnose and correct any problems.

While products that manage homogeneous networks have been available, managing heterogeneous networks is more complex and, until recently, no generally accepted heterogeneous network management standard existed. The Simple Network Management Protocol (SNMP), which originated as a means for managing the TCP/IP (Transmission Control Protocol/Internet Protocol) and Ethernet networks, has broadened rapidly since its monitoring and control transactions are completely independent of TCP/IP and Ethernet.

Using SNMP, network administrators can address queries and commands to network nodes and devices. SNMP monitors network performance and status; controls operational parameters; and reports, analyzes and isolates faults. The protocol accomplishes these functions by transporting management information between "Managers" and "Agents".

SNMP defines the following three basic components:

1. An Agent, a component housed within a managed network device such as a host, gateway, or terminal server. Each Agent stores management data and responds to the Manager's requests for this data, and may send a "TRAP", a special unsolicited SNMP message, to the Manager after sensing a prespecified condition.

2. A Manager, a component housed within a Network Management Station. The Manager queries/controls Agents using various SNMP commands.

3. A Management Information Base (MIB), a managed object database, accessible to Agents and manipulated via SNMP for network management application.

To carry out the Agent's and Manager's duties, SNMP specifies five types of commands or verbs, called Protocol Data Units (PDUs): GetRequest, GetNextRequest, SetRequest, GetResponse and Trap. Agents inspect and retrieve the management data after receiving either a GetRequest or a GetNextRequest PDU from a Manager. Managers use GetRequest for retrieving single values of the managed objects. The GetNextRequest is issued by the Manager to begin a primitive block transfer and the Agent returns the selected data with a GetResponse verb. Managers use SetRequest commands for instructing Agents to alter MIB variables while Traps are unsolicited messages sent by Agents to Managers after sensing prespecified conditions.

SNMP managed objects are logically grouped. For example, MIB II, the current Internet standard MIB, defines the following logical groups: system, interfaces, at, ip, icmp, tcp, egp, transmission, and snmp. Some of these groups are optional and may or may not be present in an SNMP managed device, depending upon the device's capability, i.e., if a device is performing exterior gateway protocol (egp) routing, the group must be present. Other, proprietary groups of objects can be created by following the proper registration scheme.

The Manager is charged with, among other things, monitoring network performance and status, controlling operational parameters, and reporting, analyzing and isolating faults in its managed domain. In order to effectively accomplish these functions, the Manager requires precise and timely data regarding the network and the nodes in the network.

FIG. 1 illustrates a simplified network having four interconnected nodes, Node 1, Node 2, Node 3 and Node 4. The nodes are logically interconnected by transmission groups (TGs). As can be seen, Node 1 is connected to Node 2 by TG A, Node 1 to Node 4 by TG E, and so forth. Each node is a managed network device in the SNMP sense and has an Agent for storing management data and for responding to the Manager, which is logically connected to each Agent. The management data in this case may include node characteristics, such as its name, type, uptime, level of service, etc., as well as TG characteristics, such as owner of the TG, destination of the TG, whether the particular TG is presently operational, etc. In this case, some of the node characteristics data are interrelated to some of the TG characteristics data. For instance, if a new node is added to the network, it would be reflected in the node characteristics data. Likewise, new TGs would be reflected in the TG characteristics data as any new TG connects to the node.

Using present management systems and methods, the Manager periodically polls its Agents using GetNextRequest PDUs for receiving the managed objects maintained by the Agents. For example, a Manager may need to provide a graphical user interface (GUI) depicting a network map. The Manager initially polls each Agent using GetNextRequest PDUs for retrieving each respective Agent's entire managed object table(s) until all of the data is retrieved for building the network map GUI. Subsequently, after some of the conditions may or may not have changed, the Manager repeats the process of polling the Agents to retrieve their respective entire managed object table(s) so that changed conditions may be noted. FIG. 2 illustrates the traditional table retrieval where the Manager issues a series of GetNextResponse commands to the Agent which responds with corresponding GetResponse messages along with the requested data. For example, when the Manager issues a GetNextRequest (Index=FIRST) PDU, the Agent responds with a GetResponse (Index=FIRST+1) PDU along with the requested record. This is process is repeated until an "End of Table" response is received by the Manager. After the Manager waits a predetermined time, it duplicates this process and again retrieves the entire managed object table (s).

Some of the managed objects are quite dynamic but there is no present mechanism for retrieving only the changed objects—rather each Agent's entire managed object table(s) must be retrieved forcing the Manager to sort through the relevant and irrelevant data. This strategy is deemed unacceptable from both a useability and a performance perspective as the overhead of re-processing the entire table(s) of thousands of entries severely impacts the performance of the network, Agent and Manager.

FIG. 3 illustrates a traditional method of receiving change/update notifications. This method of indicating to the Manager that a change has occurred in an Agent's managed object database is done by having the Agent issue an unsolicited Trap PDU with the changed data. This strategy is deemed unacceptable from a reliability perspective as an update may never reach the Manager—and/or cannot be controlled by the Manager.

Further, many times, groups of managed objects are interrelated so that, when an object in one group changes, one or more corresponding objects in another group may need to be subsequently changed. (The node and TG tables, each previously described, are an example of this situation.)

Clearly, these interrelated tables need to be in "sync" from the Manager's perspective, that is, the Manager needs to have the latest updates for each of the tables in order to have an accurate picture of the network. If the tables are not in sync, the Manager's network map depicted by the GUI could, for instance, show TGs extending into space having no destination nodes or, alternatively, could show nodes having no interconnecting TGs.

Presently, there is no mechanism for allowing the Manager to effectively maintain views of its tables which are consistent with those of the Agents.

SUMMARY OF THE INVENTION

A new system and method allows a Manager in a Simple Network Management Protocol (SNMP) environment to gather updates from its Agents. The system and method comprise the unique provision of an index which is used in each of the Agent's tables for indicating the various revisions thereof. The index lexicographically increases with each revision to the table. The Manager maintains a record of the index of the data which it has received from its Agents, requesting only that data having a lexicographically larger indexing. Further, the index is used in related tables so that the tables will be kept in "sync"in that the Manager will know whether it has the latest updates so that an accurate picture may be portrayed.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

Figure 1:
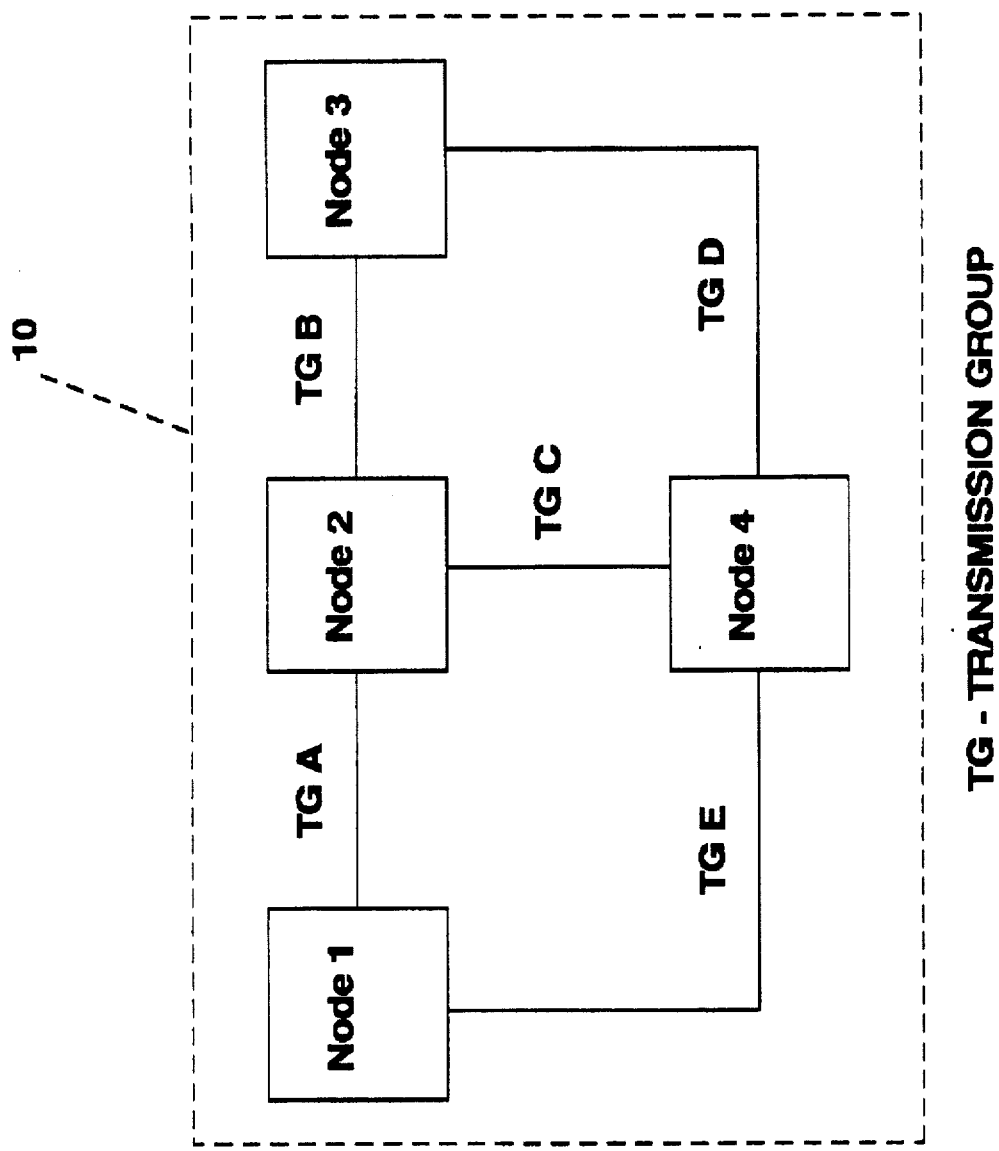
FIG. 1 is a block diagram of a representative communications network within which the present invention may be practiced.
Figure 2:
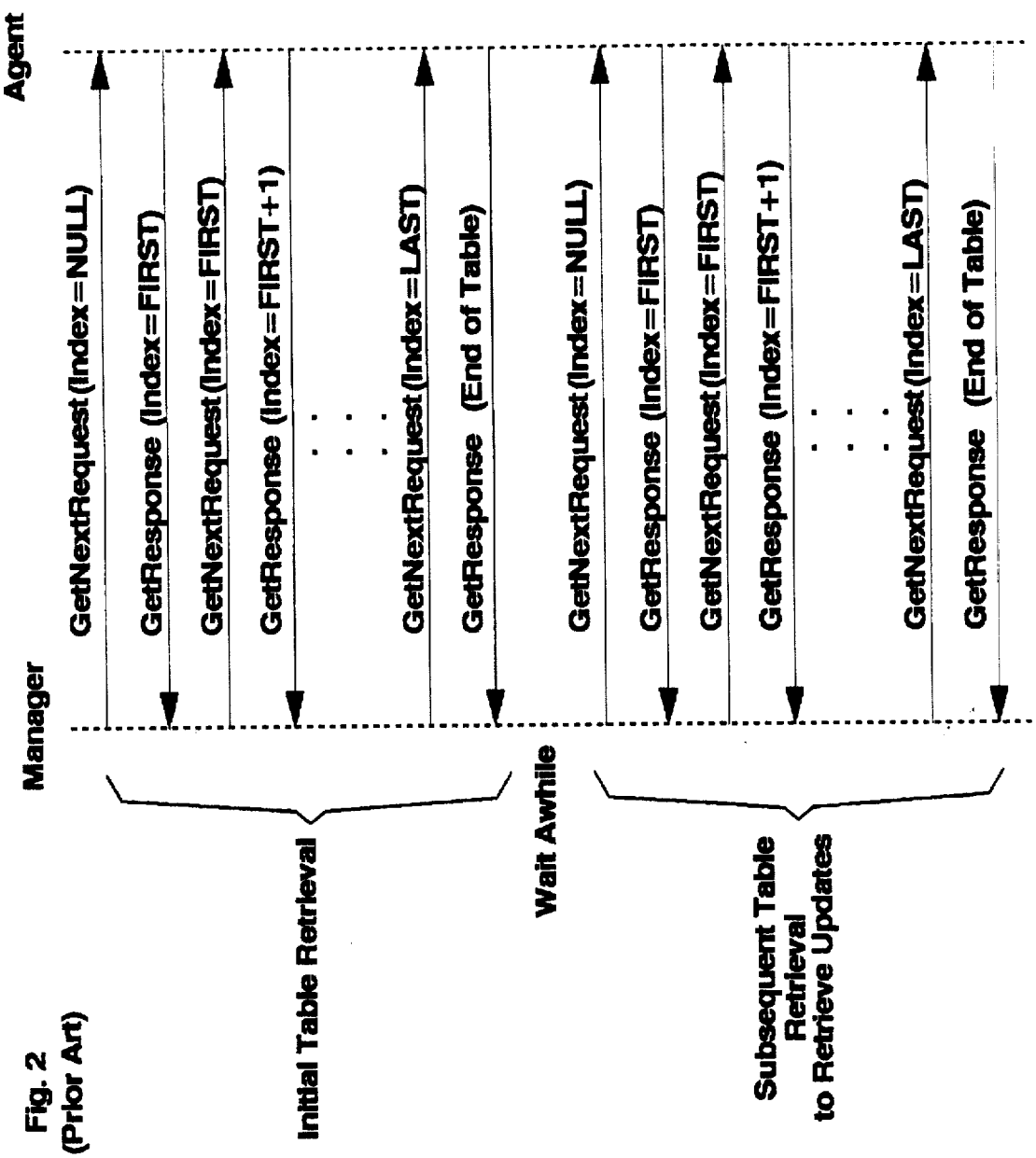
FIG. 2 depicts a flow diagram showing traditional SNMP table retrieval using GetNextRequest and GetResponse PDUs between a Manager and an Agent.
Figure 3:
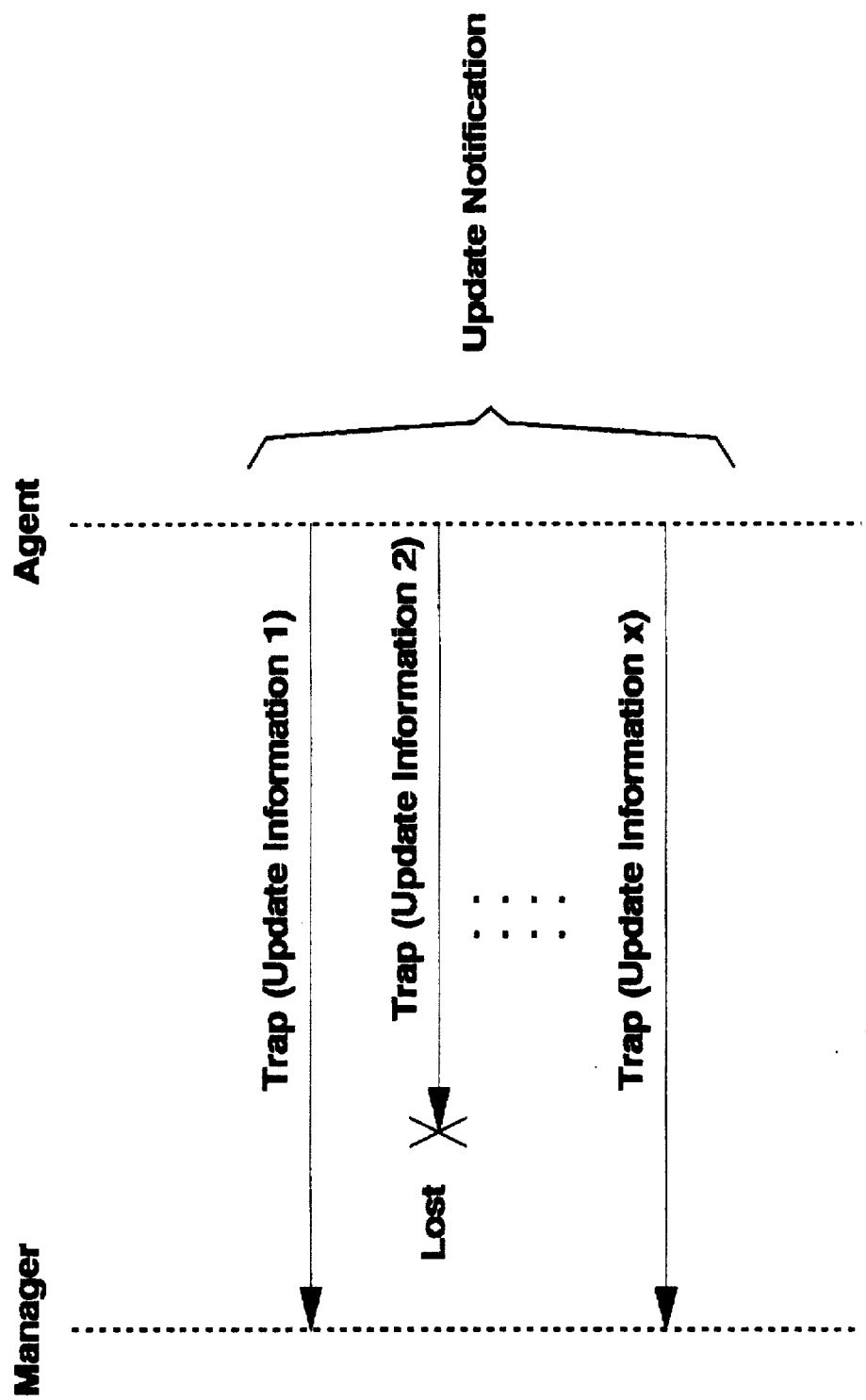
FIG. 3 depicts a flow diagram showing a traditional SNMP change/update mechanism between an Agent and a Manager using an SNMP Trap PDU.

The method of the present invention is utilized in a system conforming to the Simple Network Management Protocol (SNMP). In such a system, an SNMP Manager can address queries and commands to Agents responsible for monitoring network nodes and devices. The Manager monitors network performance and status; controls operational parameters; and reports, analyzes and isolates faults in its managed domain. Using the present invention, the Manager initially queries its Agents using GetNextRequest PDUs to retrieve the managed objects maintained by the Agents to obtain the initial status of the network. Subsequently, because the Agents use an indexing system which uniquely identifies record updates, the Manager merely polls the Agents for the updates using the last index from the previous retrieval. This process reduces the overhead of re-processing the entire table(s) of thousands of entries which would severely impact the performance of the network, Agent and Manager.

The method of the present invention can best be described in the context of a communications network having a plurality of network nodes, each network node maintaining its own tables defining managed objects and, in addition, having update information therein. In particular, the invention can be implemented in a system as described in commonly assigned U.S. Pat. No. 5,101,348 relating to a method of reducing the amount of information included in topology database update messages between network nodes in a communications network. In such a system, each network node maintains its own list of network resources in a topology database. When the state of a resource "owned" by a particular node changes, the node broadcasts a topology database update (TDU) message to the adjacent nodes. Each adjacent node updates its own topology database and rebroadcasts the message. To minimize the amount of information that must be included in TDU messages when two nodes are reconnected after an outage, each node assigns flow reduction sequence numbers (FRSNs) to TDU messages and keeps a record of the FRSN for the last TDU message sent to an adjacent node. The node also records, for each resource in its database, the FRSN of the last TDU message including that resource. When two nodes are reconnected after an outage, for example, the sending node includes in the TDU message only those resources having a FRSN greater than the FRSN assigned to the last TDU sent to the adjacent node to which the TDU message is directed.

The method of the present invention uniquely takes advantage of the information stored in the network nodes of the described system. Specifically, the Agents for each SNMP managed device maintain the managed objects and utilize FRSNs in building the index for the managed objects in its tables so that changes to the tables can be identified and only the updates are requested by the Manager after an initial retrieval of the managed objects is completed. In other words, along with each managed object, a FRSN (in this case) is included as part of the index in order to identify the revision level of the object.

Figure 4:
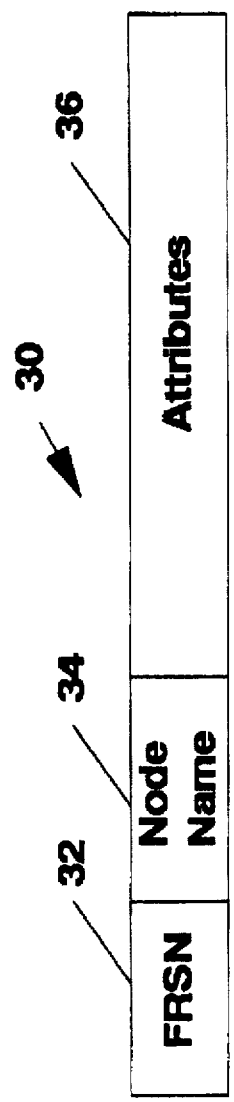
FIG. 4 depicts a record of the type stored by the SNMP Agent of the present invention.
Figure 5:
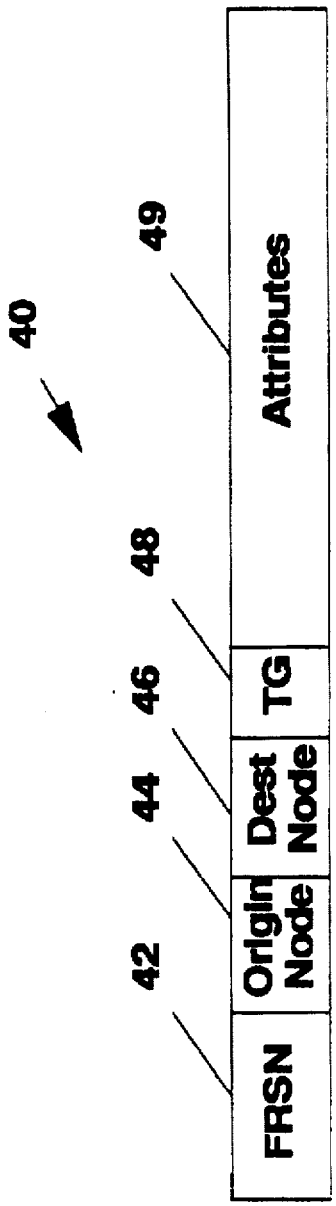
FIG. 5 depicts another record of the type stored by the SNMP Agent of the present invention.

Resource records of the types stored in the node characteristics table and of the transmission group (TG) characteristics table are shown in FIG. 4 and FIG. 5, respectively. For instance, each node record 30 is made up of a flow reduction sequence number (FRSN) field 32, a node name field 34, and a plurality of attributes fields 36 for storing the particular node characteristics which are being managed such as its type, level of service, etc. The FRSN and node name (or "FRSN.NodeName") are used to index the record to differentiate it from the remaining records in the database. Likewise, each TG record 40 is made up of an FRSN field 42, an origin node field 44, a destination node field 46, a TG name field 48 and a plurality of attributes fields 49 for storing the managed TG attributes, such its cost, security level, etc. The TG record is indexed using the FRSN field 42, the origin node field 44, the destination field 46 and the TG name field 48 (or "FRSN.OriginNode.DestNode.TGName") thereby assigning it a unique index per record.

The Agent of the managed network device builds node and TG tables with these records. For example, initially, the Agent is able to build its node and TG tables using the information that it has available to it regarding the managed objects for which it is responsible. Subsequently, each time a node receives updated information in the form of a TDU from one of its adjacent nodes, the updated information, as well as the FRSN assigned by this Agent, is recorded in the respective table by the Agent. In this manner, the tables include not only the present status of the managed objects but in addition a running history of the object changes. The Manager merely has to retrieve the initial table(s) and to periodically retrieve the table updates in order to consistently maintain an accurate network picture.

The Manager is able to retrieve these records using GetNextRequest PDUs as defined by SNMP. As discussed above, the GetNextRequest command retrieves the next following object from the object specified. The GetNextRequest verb is particularly useful in update retrieval where the GetNextRequests are based upon the index where part of the index reflects incremental updates to the table and only the record updates are obtained. Where no updates have occurred, an "End of Table" response is returned. This response is actually the next object in the MIB tree or a "noSuchName" response.

Figure 6:
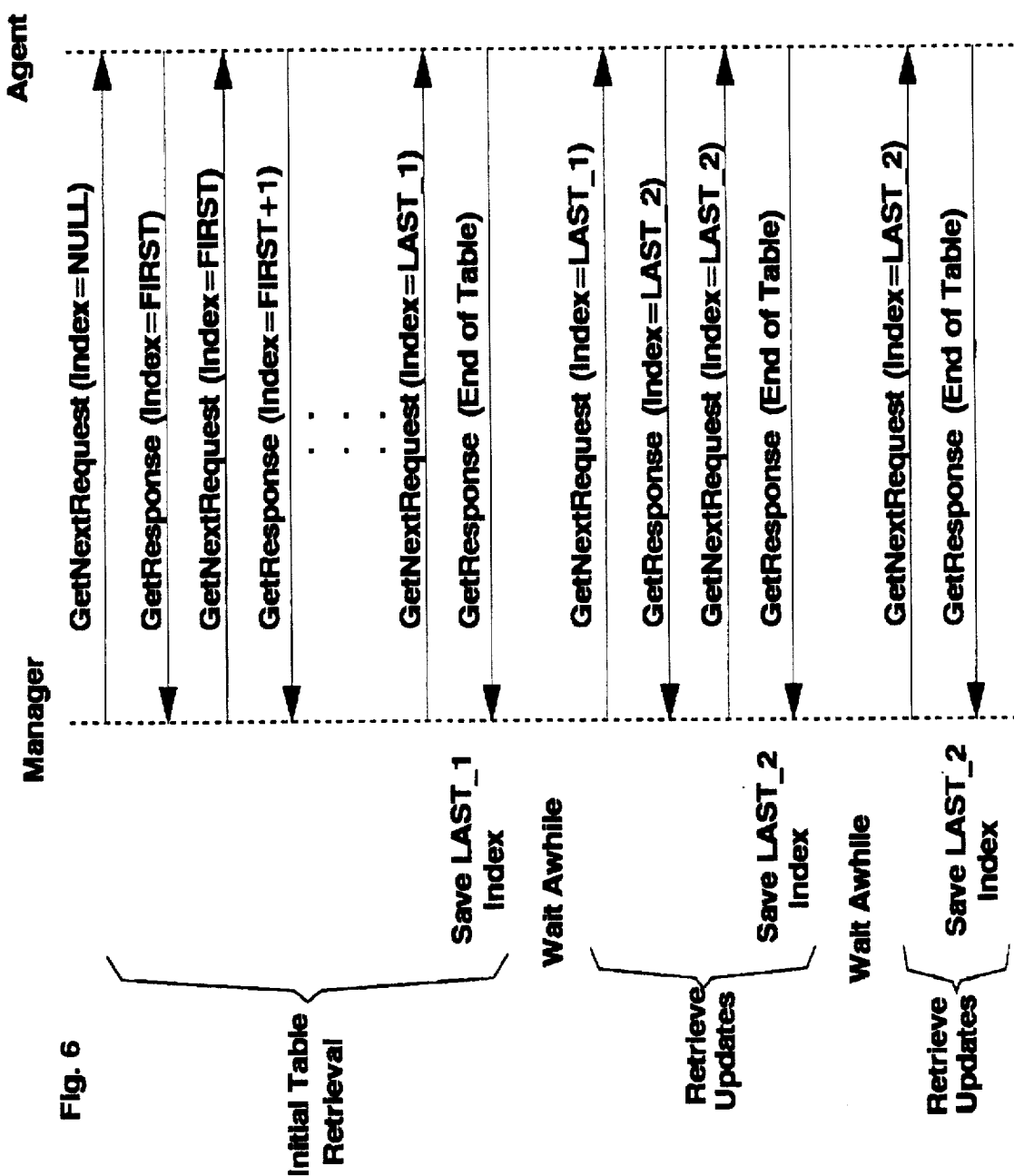
FIG. 6 is a flow diagram showing the flow of messages between a Manager and an Agent of the present invention.

FIG. 6 illustrates the message flow between an SNMP Manager and an Agent where the Manager is initially retrieving a table and subsequently retrieving updates to the table. In order to retrieve the initial table, the Manager issues a GetNextRequest having a NULL index to the Agent. The Agent responds with the entry corresponding to the first index of the table. The Manager continues to issue GetNextRequests until an "End of Table" response is returned by the Agent. The Manager then stores the last index (LAST_1) returned by the Agent; and waits for some given period of time. When the predetermined time interval has expired, the Manager issues a GetNextRequest using the last index returned by the Agent (LAST$_{13}$1). The Agent will then return only updates to the table, if any have occurred, or an "End of Table" response. Thus, only table updates or an "End of Table" response is returned to the Manager in response to subsequent GetNextRequests.

Figure 7:
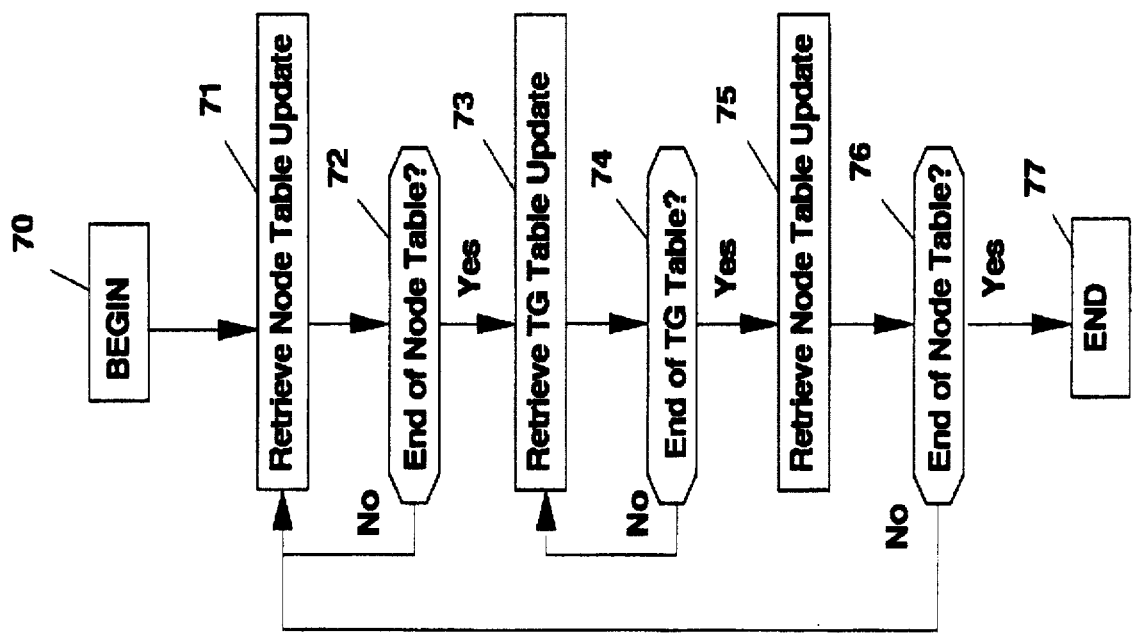
FIG. 7 is a flow diagram performed at the Manager for retrieving an initial table and subsequent record updates.

FIG. 7 illustrates the general logic flow used by the Manager in monitoring and synchronizing two tables such as the Agent's node and TG tables. The Manager, beginning at 70, proceeds to retrieve node table updates, at 71, from the Agent. If the Agent returns a node update in response to the Manager's request, at 72, the manager performs another retrieve node update at 71. When the Agent does respond with an "End of Table" message to the node update request, the Manager proceeds to retrieve a TG update, at 73 from the Agent. If the Agent returns a TG update in response to the Manager's request, at 74, the Manager performs another retrieve TG update at 73. When the Agent responds with an "End of Table" message to the node update request, the Manager proceeds to retrieve a node update, at 75, from the Agent. If the Agent returns a node update in response to the Manager's request, at 76, the Manager repeats this sequence again beginning at 71. If the Agent returns an "End of Table" response, at 76, the process is complete; and the two tables are in "sync".

Although not shown in FIG. 7, the Manager logic would normally include a retry test and a consistency test. The retry test would be executed after attempting to retrieve a node table update, at 71 and 75, and after attempting to retrieve a TG table update at 73. This retry test would be performed to handle the case where the Agent did not respond to the Manager's request due to some error condition such as the request or response was lost in the network. Similarly, the consistency test would be performed to insure that the Agent was not re-started between the time the Agent last responded and the Manager issued the next request. This test could be based upon the Agent's uptime. If the Agent's uptime was inconsistent (less than that provided in the last response), the Manager would discard the Agent's previous response data and commence the process from the start.

The method and system described allow an SNMP Manager to retrieve an initial picture of the status of specified managed objects and to monitor the status of those objects with minimal message flow between the Manager and the Agent. The reduction of message flow between the Manager and Agent allows the network to perform optimally as it is not saturated with network management message flows. The method and system of the present invention have been described in terms of a system having network nodes each maintaining its own list of network resources in a topology database and utilizing an index which reflects updates to the table. The present invention is not specifically directed at this type of system, however, and may be implemented using any type of index number where a lexicographically larger index indicates an update.

This system and method has significant advantages over traditional retrieval systems and methodologies. It can provide significant performance benefits to the network. Agent and Manager. It can provide an atomic snapshot of a table at a given point in time. It can provide synchronization between multiple tables.

The system and method of the present invention also has advantages over traditional Trap methods. It can be controlled by the Manager and insures the delivery of updates.

Thus, it can be seen that the method and system of the present invention allows a Manager in an SNMP environment to gather updates from its Agents without saturating the network with unnecessary message flows. This is accomplished through the unique utilization of an index which is used in each of the Agent's tables for indicating updates to the particular table. While the invention has been particularly shown and described with reference to preferred embodiments thereof, it will be understood by those skilled in the art that various other changes in form and detail may be made without departing from the spirit and scope of the invention.

What is claimed is:

1. For use in a Manager of a network conforming to the Simple Network Management Protocol (SNMP) comprising at least one Agent, said Agent maintaining at least one table, each table comprising a plurality of individual records defining one or more individual managed objects, each individual record having a unique index assigned thereto, a method of monitoring said table comprising the steps of:

- requesting from said Agent, from at least one table, all of said plurality of individual records for said managed objects which said Manager wishes to monitor;
- receiving from said Agent said requested individual records for said managed objects;
- inspecting each individual record of said plurality of individual records received from said Agent to determine said unique index of each individual record;
- maintaining a record of said index of a most recently received record for each managed object;
- periodically requesting from said Agent, from said at least one table, a next record defining a changed managed object representing an update to said most recently received record for each managed object as indicated by said index of the most recently received record for each managed object, said next record having an index, said index comprising said changed object, said next record index being lexicographically larger than the index of said most recently received record for each managed object; and
- after said periodically requesting step, receiving said next record for said changed managed object and maintaining a record of said lexicographically larger index.

2. The method defined in claim 1 wherein said network comprises a plurality of nodes and a corresponding plurality of Agents, each of said Agents maintaining a node characteristics table and a transmission group characteristics table.

3. For use in a network conforming to the Simple Network Management Protocol (SNMP) comprising at least one Agent, said Agent maintaining at least one table, each table comprising a plurality of individual records defining one or more individual managed objects, each individual record having a unique index assigned thereto, a Manager for monitoring said table comprising:

- means for requesting from said Agent, from at least one table, all of said plurality of said individual records for said managed objects which said Manager wishes to monitor;
- means for receiving from said Agent said requested individual records for said managed objects;
- means for inspecting each individual record of said plurality of individual records received from said Agent to determine said unique index of each individual record;
- means for maintaining a record of said index of a most recently received record for each managed object;
- means for periodically requesting from said Agent, from said at least one table, a next record defining a changed managed object representing an update to said most recently received record for each managed object as indicated by said index of the most recently received record for each managed object, said next record having an index, said index comprising said changed managed object, said next record index being lexicographically larger than the index of said most recently received record for each managed object; and
- means for receiving said next record for said changed managed object and maintaining a record of said lexicographically larger index.

4. The Manager defined in claim 3 wherein said network comprises a plurality of nodes and a corresponding plurality of Agents, each of said Agents maintaining a node characteristics table and a transmission group characteristics table, said Manager further comprising means for receiving the records of said tables and means for periodically polling said Agents for updates to said tables.

5. A network conforming to the Simple Network Management Protocol (SNMP) comprising at least one Agent, said Agent maintaining at least one table, each table comprising a plurality of individual records defining one or more individual managed objects, each individual record having a unique index assigned thereto, a Manager for monitoring said table comprising means for requesting from said Agent, from at least one table, all of said plurality of said individual records for said managed objects which said Manager wishes to monitor, means for receiving from said Agent said requested individual records for said managed objects, means for inspecting each individual record of said plurality of individual records received from said Agent to determine said unique index of each individual record, means for maintaining a record of said index of a most recently received record for each managed object, means for periodically requesting from said Agent, from said at least one table, a next record defining a changed object representing an update to said most recently received record for each managed object as indicated by said index of the most recently received record for each managed object, said next record having an index comprising said changed managed object, said next record index being lexicographically larger than the index of said most recently received record for each managed object, and means for receiving said next record for said changed managed object from said Agent and maintaining a record of said lexicographically larger index.

* * * * *